(12) United States Patent
Nabetani et al.

(10) Patent No.: US 7,680,064 B2
(45) Date of Patent: Mar. 16, 2010

(54) WIRELESS COMMUNICATION APPARATUS AND TRANSMISSION CONTROL METHOD

(75) Inventors: Toshihisa Nabetani, Kawasaki (JP); Ryoko Matsuo, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 473 days.

(21) Appl. No.: 11/809,296

(22) Filed: May 31, 2007

(65) Prior Publication Data
US 2007/0291829 A1    Dec. 20, 2007

(30) Foreign Application Priority Data
Jun. 12, 2006  (JP) ............................. 2006-162651

(51) Int. Cl.
*H04L 1/16*    (2006.01)
(52) U.S. Cl. ........................... 370/252; 370/338; 455/69
(58) Field of Classification Search ................. 370/252, 370/253, 229, 328, 332, 338; 455/67.11, 455/67.13, 67.16, 69, 450, 452.1, 452.2; 375/223, 227, 233; 714/750
See application file for complete search history.

(56) References Cited

U.S. PATENT DOCUMENTS

2007/0141994 A1* 6/2007 Cheng .................... 455/69
2007/0258402 A1* 11/2007 Nakamata et al. ........... 370/329
2007/0291671 A1* 12/2007 Yoshii ........................ 370/310

FOREIGN PATENT DOCUMENTS

JP    2003-324382    11/2003

OTHER PUBLICATIONS

EWC HT MAC Specification, Ver. V1.24, Chap. 6, Section 17, "Link Adaptation", Jan. 2006.

* cited by examiner

*Primary Examiner*—Ricky Ngo
*Assistant Examiner*—Kan Yuen
(74) *Attorney, Agent, or Firm*—Ohlandt, Greeley, Ruggiero & Perle, L.L.P.

(57) ABSTRACT

A wireless communication apparatus includes a transmitter and a receiver, and determines a modulation and error correction coding scheme used by the transmitter. The apparatus estimates a degree of channel variation, transmits, by the transmitter, a first frame for requesting response information necessary to select the modulation and error correction coding scheme, measures a response time between a instant when the transmitter transmits the first frame and an instant when the receiver receives a second frame including the response information, determines a threshold value of the response time for determining reliability of the response information, based on the degree of channel variation, and determines the modulation and error correction coding scheme selected based on the response information included in the second frame received by the receiver in the response time shorter than the threshold value.

20 Claims, 5 Drawing Sheets

WIRELESS COMMUNICATION APPARATUS AND TRANSMISSION CONTROL METHOD

CROSS-REFERENCE TO RELATED APPLICATIONS

This application is based upon and claims the benefit of priority from prior Japanese Patent Application No. 2006-162651, filed Jun. 12, 2006, the entire contents of which are incorporated herein by reference.

BACKGROUND OF THE INVENTION

1. Field of the Invention

The present invention relates to a wireless communication apparatus.

2. Description of the Related Art

In a wireless communication system, there has been contrived link adaptation control aimed at maximizing the transmission rate while maintaining the quality of communication by adaptively selecting a modulation scheme and an error correction coding rate (MCS: Modulation and Coding Scheme) in accordance with a wireless transmission path state (channel state).

Link adaptation control performs MCS selection on the basis of reception quality, e.g., an SINR (Signal to Interference and Noise Ratio), RSSI (Received Signal Strength Indicator), or PER (Packet Error Rate).

Proposed link adaptation control schemes include the open-loop link adaptation scheme of independently performing MCS selection on the transmitter terminal and the closed-loop link adaptation scheme of performing MCS selection by using feedback information from the receiver terminal (see, for example, JP-A 2003-324382 (KOKAI)).

In general, MCS selection with higher accuracy can be expected in accordance with a channel state from closed-loop link adaptation control which can use feedback information from the receiver terminal as a transmission partner than from open-loop link adaptation control of determining MCS selection only on the transmitter terminal. For this reason, the use of the closed-loop link adaptation scheme is now actually under review in standardization of IEEE802.11n specification as a next-generation wireless LAN specification (see, for example, Joint Proposal: "High throughput extension to the 802.11 Standard: MAC," IEEE 802.11-05/1095r2, November 2005).

The closed-loop link adaptation scheme in which feedback information from the receiver terminal is available is based on the premise that it basically performs MCS control reflecting a feedback result from the receiver terminal. If, however, there is no specification about the timing of returning a feedback result after a feedback request is issued, the transmitter terminal cannot know the exact timing when the feedback result is returned. It is conceivable, in particular, that in a wireless LAN, since the transmitter terminal transmits frames after acquiring a transmission access right by using CSMA/CA (Carrier Sense Multiple Access with Collision Avoidance), if many terminals exist, it requires time more than expected until the return of a feedback result.

Although in a wireless LAN, HCCA (HCF Controlled Channel Access) of central control method is also specified as access method, since even in HCCA, the station terminal side may require a certain time to acquire an access right, it is conceivable that a similar situation occurs until the return of a feedback result.

The information of a feedback result returned in a certain time may lack reliability in a wireless environment in which the channel state greatly varies. That is, since the channel state varies, the wireless environment at the time of return of a feedback result may have become different from the wireless environment for the feedback information. In such a case, when the transmitter terminal performs MCS control reflecting a returned feedback result, the control is not optimal and may lead to deterioration in communication quality or throughput.

When using the closed-loop link adaptation scheme, the transmitter terminal needs to determine timing at which it transmits a feedback request necessary to receive feedback. It is conceivable to use a method of periodically transmitting a feedback request frame. However, indiscriminately transmitting feedback request frames will increase unnecessary traffic, in particular, in a case of many terminals and lead to a deterioration in the throughput of the overall system. In contrast to this, decreasing the frequency of feedback requests will lead to inability to adaptively perform MCS control following a varying wireless propagation state. In order to prevent this, it is necessary to issue a feedback request at a necessary timing as needed.

As described above, conventionally, MCS control using the closed-loop link adaptation scheme suffers from great variations in channel state, and uses a feedback result with low reliability. This causes deterioration in communication quality or throughput.

BRIEF SUMMARY OF THE INVENTION

According to embodiments of the present invention, a wireless communication apparatus includes:

a transmitter;

a receiver;

an estimation unit configured to estimate a degree of channel variation; and a control unit configured to determine a modulation scheme and an error correction coding scheme used by the transmitter;

wherein the control unit includes a transmission control unit configured to control the transmitter so as to transmit a first frame for requesting response information necessary to select the modulation scheme and the error correction coding scheme;

a measurement unit configured to measure a response time between a instant when the transmitter transmits the first frame and a instant when the receiver receives a second frame including the response information;

a threshold determination unit configured to determine a threshold value of the response time for determining reliability of the response information, based on the degree of channel variation; and a determination unit configured to determine the modulation scheme and the error correction coding scheme selected based on the response information included in the second frame received by the receiver in the response time shorter than the threshold value.

DETAILED DESCRIPTION OF THE INVENTION

The embodiments of the present invention will be described below with reference to the views of the accompanying drawing.

First Embodiment

Figure 2:
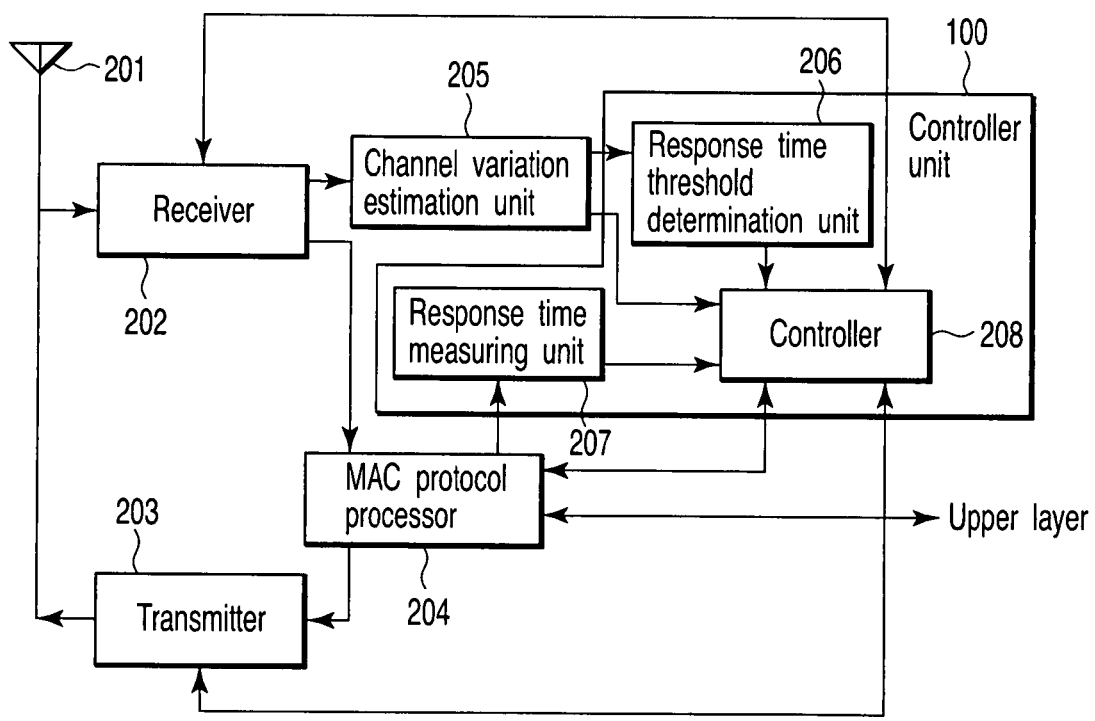
FIG. 2 is a block diagram showing an example of the arrangement of a wireless communication apparatus according to an embodiment.

The wireless communication apparatus shown in FIG. 2 includes an antenna unit 201, a receiver 202, a transmitter 203, a MAC protocol processor 204, channel variation estimation unit 205, and a control unit 100. The control unit 100 includes a response time threshold determination unit 206, response time measuring unit 207, and controller 208.

The receiving operation of the wireless communication apparatus in FIG. 2 will be described. The receiver 202 demodulates the signal received through the antenna unit 201 after performing necessary processing such as frequency conversion to baseband and A/D conversion, and outputs the resultant signal to the MAC protocol processor 204 and the channel variation estimation unit 205. The MAC protocol processor 204 performs a CRC check and retransmission processing and desired MAC protocol processing or the like corresponding to the type of the received frame, as needed, with respect to the input signal. If the type of the frame is a data frame, the MAC protocol processor 204 notifies the upper layer of the payload of the data.

The received frame may be either a data frame transmitted from the communication partner of the wireless communication apparatus or a reception confirmation response frame transmitted from the communication partner in response to a data frame transmitted from the wireless communication apparatus to the communication partner. For example, in a wireless LAN system, the receiver terminal which has received a data frame notifies the transmitter terminal of the success/failure of reception of the data frame by transmitting a confirmation response frame such as an ACK or a Block Ack. If the received data is a data frame, the MAC protocol processor 204 outputs the payload in the data frame to the upper layer. If the received data is a confirmation response frame (an ACK to each frame in an aggregated frame) to the previously transmitted data frame, the MAC protocol processor 204 notifies the controller 208 of the confirmation response.

The transmitting operation of the wireless communication apparatus in FIG. 2 will be described next. The MAC protocol processor 204 generates a data frame from the data notified from the upper layer, and also generates a control frame, which is generated within the MAC protocol. The MAC protocol processor 204 then controls the generated data frame and control frame on the basis of a series of access control operations, and outputs the resultant frame to the transmitter 203. The transmitter 203 performs modulation processing and error correction coding processing for the input frame in accordance with the modulation scheme and error correction coding rate determined by link adaptation control by the controller 208, and further performs necessary processing such as D/A conversion and frequency conversion to a radio signal with a predetermined frequency with respect to the input frame, thereby transmitting the resultant frame to the radio terminal apparatus at the transmission destination through the antenna unit 201.

The controller 208 performs link adaptation control to adaptively select a modulation scheme and error correction coding rate to be used in the transmitter 203 in accordance with a channel state. Assume that in this case, the controller 208 performs closed-loop link adaptation control, i.e., causing the receiver terminal to transmit, to the transmitter terminal, reception quality such as an SINR or RSSI measured on the receiver terminal or the modulation scheme and error correction coding rate selected on the basis of the reception quality, and reflecting the received information on the transmitter terminal.

Figure 1:
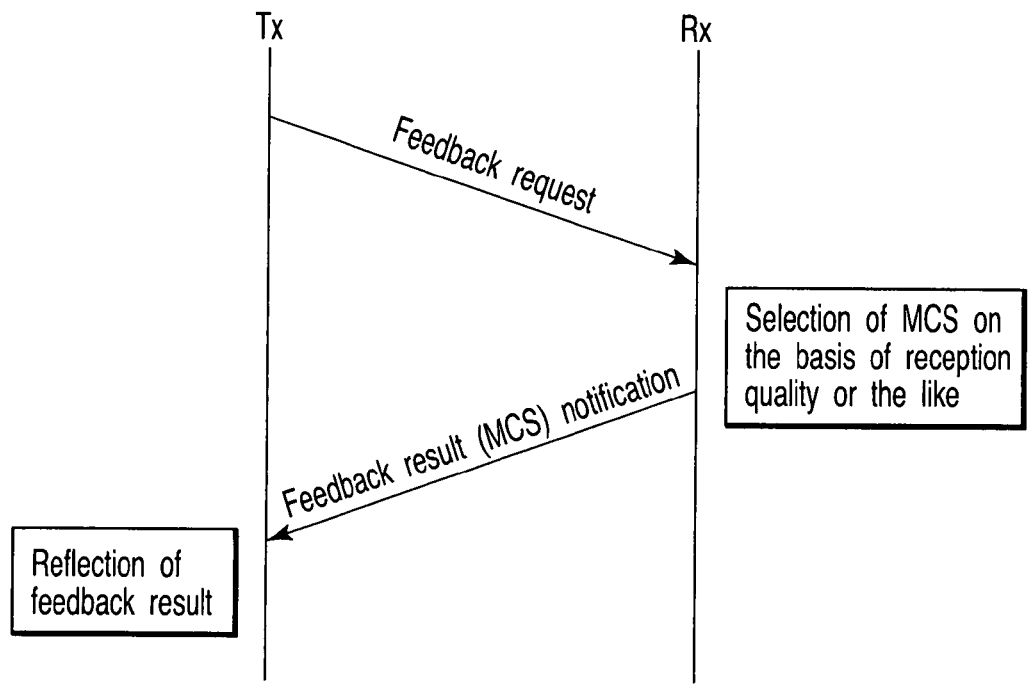
FIG. 1 is a view for explaining a closed-loop link adaptation control procedure.

FIG. 1 shows an example of a case wherein MCS information itself is feedback in the closed-loop link adaptation scheme.

The case of FIG. 2, the controller 208 transmits a feedback request frame to the receiver-end wireless communication apparatus communication apparatus, and the receiver-end wireless communication apparatus transmits a feedback response frame corresponding to the request frame. Using this feedback response frame will notify the transmitter terminal of the SINR or RSSI measured on the receiver terminal or the modulation scheme and error code correction coding rate selected on the receiver terminal. The controller 208 determines whether to use the information notified through this feedback response frame. Upon determining the use of the information, the controller 208 selects the modulation scheme and error correction coding rate on the basis of the notified reception quality such as an SINR or RSSI, and notifies the transmitter 203 of the selected modulation scheme and error correction coding rate. Alternatively, the controller 208 notifies the transmitter 203 of the notified modulation scheme and error correction coding rate.

The channel variation estimation unit 205 estimates the degree of channel state variation, i.e., the degree of variation in channel characteristic (fading) accompanying the movement of the wireless communication apparatus and the lapse of time. The channel variation estimation unit 205 estimates the degree of fading variation by observing the fading on the basis of the reception signal received through the antenna unit 201. The response time threshold determination unit 206 determines a response time threshold for the time interval between the instant when the transmitter 203 transmits a feedback request frame and the instant when the receiver 202 receives a feedback response frame in accordance with the degree of fading variation estimated by the channel variation estimation unit 205.

Figure 3:
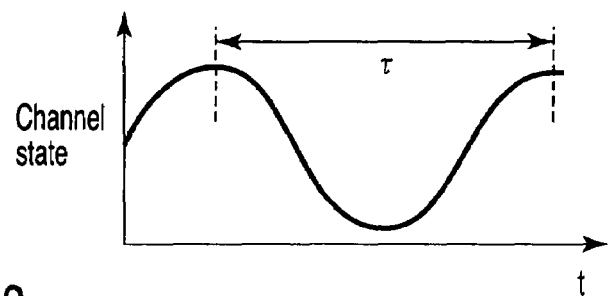
FIG. 3 is a graph showing variations (long-period variations) in channel state.
Figure 4:
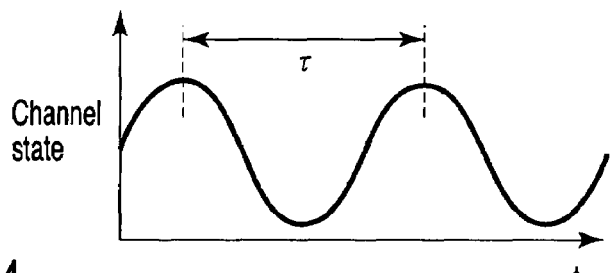
FIG. 4 is a graph showing variations (short-period variations) in channel state.

A response time threshold value is basically determined in accordance with the following policy. If the degree of channel variation estimated by the channel variation estimation unit 205 indicates long-period variation like that shown in FIG. 3, i.e., slow fading variation (a low variation degree), a large response time threshold is set. If the degree of channel variation indicates short-period variation like that shown in FIG. 4, i.e., fast fading variation (a high variation degree), a small response time threshold is set.

The channel variation estimation unit 205 calculates, for example, a time during which the channel characteristic does not greatly change (fading variation period) as a numerical value representing the degree of channel fading variation.

A fading variation period is the reciprocal ($1/f_d$) of a maximum Doppler frequency ($f_d$). If a moving velocity can be detected, a fading variation period can be obtained by calculating a maximum Doppler frequency on the basis of the moving velocity (v) and a carrier frequency ($f_c$) according to $$F_d = (v/c) f_c \quad (c: \text{velocity of light})$$

and obtaining the reciprocal of the maximum Doppler frequency. Even if a moving velocity (v) cannot be detected, observing or estimating Doppler broadening makes it possible to obtain a maximum Doppler frequency ($f_d$) and hence obtain a fading variation period.

In addition, a fading variation period can also be obtained by using the correlation coefficient or the like of the autocorrelation function of a fading received signal. In this case, if fading variation is represented by $$c(t) = c_I(t) + j \cdot c_Q(t)$$

then, the autocorrelation function of c(t) is given by $$R(\tau) = R_I(\tau) + j \cdot R_Q(\tau)$$
$$= \int_{-f_d}^{f_d} S(f) \cos(2\pi f \tau) df + \int_{-f_d}^{f_d} S(f) \sin(2\pi f \tau) df$$
$$= E[c_I(t) c_I(t+\tau)] + j \cdot E[c_I(t) c_Q(t+\tau)]$$

If a power spectrum density function S(f) is given by $$S(f) = \frac{b_0}{\pi f_d \sqrt{1 - \left(\frac{f}{f_d}\right)^2}}$$

then, RI($\tau$) and RQ($\tau$) are given by $$RI(\tau) = b_0 J_0(2\pi f_d \tau)$$

$$RQ(\tau) = 0$$

Note that $J_{0\,()}$ is a 0th-order class 1 Bessel function.

Therefore, when the autocorrelation function of fading is normalized with an average power ($b_0$) of a received signal, a time correlation coefficient in complex amplitude variation is obtained by $$\rho_I(\tau) = R_I(\tau)/b_0 = J_0(2\pi f_d \tau) \quad (f_d: \text{Doppler frequency}) \quad (1)$$

The value of $\rho_I(\tau)$ obtained from equation (1) is defined as the time correlation between a complex amplitude at a given time point (t) and a complex amplitude at a time point (t+$\tau$) after the lapse of a time $\tau$. The larger this value (the higher the correlation), the smaller the variation is, and vice versa.

A time correlation coefficient in fading envelope variation is expressed by $$\rho_r(\tau) = J_0^2(2\pi f_d \tau) \quad (2)$$

The value of $\rho_r(\tau)$ obtained from equation (2) is defined as the time correlation between an envelope at a given time point (t) and an envelope at a time point (t+$\tau$) after the lapse of a time $\tau$. The larger this value (the higher the correlation), the smaller the variation is, and vice versa.

The channel variation estimation unit 205 therefore calculates the autocorrelation value between the reception power or reception envelope measured by the receiver 202 when a frame is received at a given time point t and the reception power or the reception envelope measured by the receiver 202 when a frame is received at a time point (t+$\Delta$t) after the lapse of time $\Delta$t. Note that a correlation value closer to "1" indicates that the correlation between the two values is higher and hence the degree of variation is lower. If the calculated correlation value is equal to or less than a predetermined threshold (e.g., "0.5"), it is determined that there is no time-correlated, and the time $\Delta$t at this point of time can be regarded as fading variation period $\tau = 1/f_d$.

For example, the channel variation estimation unit 205 obtains the autocorrelation value between reception powers or reception envelopes at two different time points, and sets the time interval $\Delta$t between the two time points as the fading variation period $\tau$ if the autocorrelation value is equal to or less than a predetermined threshold (e.g., "0.5").

The channel variation estimation unit 205 notifies the response time threshold determination unit 206 of a parameter (e.g., the fading variation period $\tau$) representing the obtained degree of fading variation.

The response time threshold determination unit 206 determines a response time threshold on the basis of the parameter value (fading variation period $\tau$) representing the variation degree in the following manner. Although the following will exemplify a fading variation period as a parameter representing the degree of fading variation, it suffices to use any parameter representing the degree of fading variation, and a similar policy can be used to deal with such a case.

If fading variation period $\tau < t_1$: then the response time threshold is set to $T_1$.

If $t_1 \leq$ fading variation period $\tau < t_2$: then the response time threshold is set to $T_2$.

If $t_2 \leq$ fading variation period $\tau < t_3$: then the response time threshold is set to $T_3$.

If $t_n \leq$ fading variation period $\tau$: then the response time threshold is set to $T_n$.

Note that $t_1 < t_2 < \ldots < t_n$ (n is an arbitrary natural number), and $T_1 < T_2 < \ldots < T_n$ (n is an arbitrary natural number).

As described above, a time as a response time threshold increases as the fading variation period increases, i.e., the variation degree decreases.

In this case, $t_k$ and $T_k$ (k=1 to n) need not be fixed values but may be variable in accordance with the application to be used or the use environment. Alternatively, these values may be variable in accordance with information at the MAC layer, e.g., the type of access control, the type of retransmission method, the number of terminals belonging to the same system, or a packet error rate.

The above description has exemplified the case of obtaining the degree of fading variation by using a time correlation coefficient as an evaluation reference. However, it suffices to use any method which can estimate a channel variation period or variation degree instead of the method using an autocorrelation coefficient.

The channel variation estimation unit 205 calculates the degree of fading variation and the response time threshold determination unit 206 determines/updates a response time threshold at every reception of a frame or periodically, as needed.

The controller 208 determines the reliability of a returned feedback response by using the response time threshold determined by the response time threshold determination unit 206, and determines on the basis of the determination result whether to reflect the feedback response.

The response time measuring unit 207 measures the time interval from the instant when the transmission of a feedback request frame for closed-loop link adaptation is started to the instant when a corresponding feedback response frame can be properly received, and notifies the controller 208 of the measured time as a feedback response time. In this case, if it is possible to detect the timing at which after a feedback response frame is received, the next frame is transmitted, it suffices to use the time interval from the transmission of a feedback request frame to the detected timing as a feedback response time.

Figure 5:
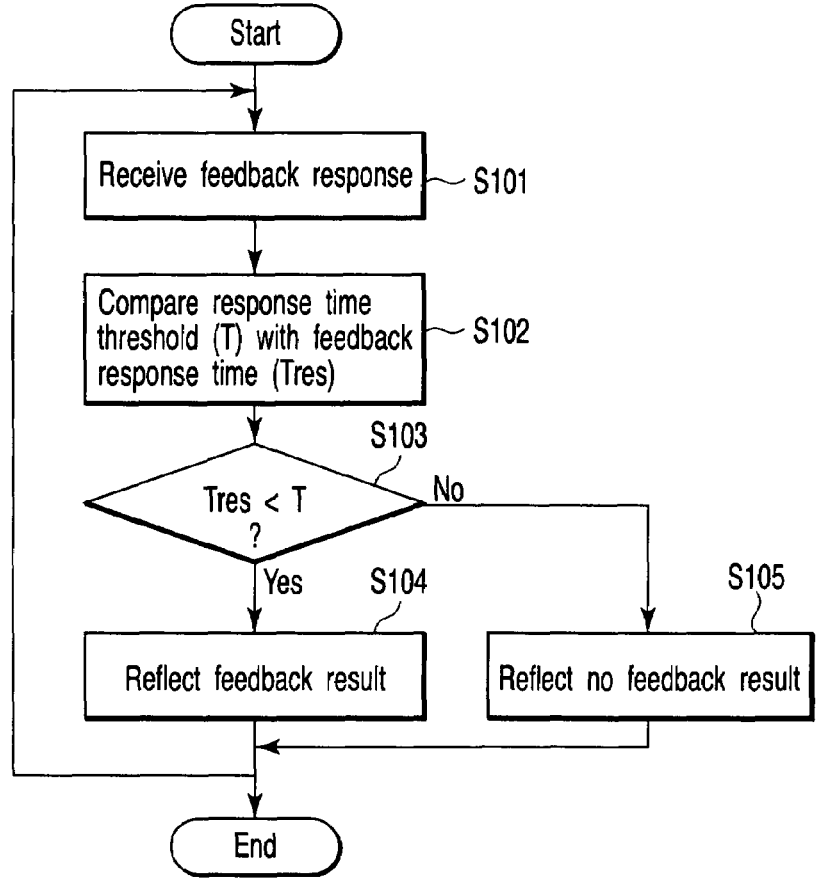
FIG. 5 is a flowchart for explaining the control processing operation of a controller according to the first embodiment.

The controller 208 performs control processing like that shown in FIG. 5. That is, upon receiving a feedback response frame through the antenna unit 201, receiver 202, and MAC protocol processor 204 (step S101), the controller 208 compares the response time threshold (T) determined by the response time threshold determination unit 206 with the time interval from the transmission of the feedback request frame to the return of the feedback response frame, which is measured by the response time measuring unit 207, i.e., the feedback response time (Tres) (step S102).

If the feedback response time (Tres) is shorter than the response time threshold (T), i.e., the feedback response frame can be received at an early timing compared with the response time threshold (S103), the process advances to step S104. In step S104, the controller 208 determines that the information notified through the feedback response frame is high in reliability, and changes the MCS as needed upon reflection of the feedback response result. That is, upon being notified of a modulation scheme and an error correction coding rate from the communication partner through the feedback response frame, the controller 208 notifies the transmitter 203 of the modulation scheme and error correction coding rate notified through the feedback response frame. Thereafter, the transmitter 203 performs modulation processing and error correction coding processing in accordance with the notified modulation scheme and error correction coding rate.

If the feedback response time (Tres) is longer than the response time threshold (T), i.e., a feedback response frame is received at a delayed timing compared with the response time threshold (step S103), the process advances to step S105. In step S105, the controller 208 determines that the information notified through the feedback response frame is low in reliability, and does not reflect the feedback response result.

As described above, in closed-loop link adaptation control, determining the reliability of a feedback response by using channel state variation and a feedback response time and reflecting the feedback result when only the reliability is high can prevent the execution of MCS control inappropriate for the channel state and hence prevent a deterioration in throughput.

Note that the controller 208 may determine whether to reflect a feedback result in combination with open-loop link adaptation control information.

Control processing by the controller 208 comprising the open-loop link adaptation control function as well as the above closed-loop link adaptation control function will be described with reference to the flowchart shown in FIG. 6.

Open-loop link adaptation control is designed to estimate a radio channel state by using a confirmation response (ACK) frame to each data frame transmitted from the wireless communication apparatus on the basis of the number of frames, of the transmitted data frames, to which confirmation response frames could be received, the number of times confirmation response frames to data frames could be received (e.g., a packet error rate), and the like. The controller 208 then selects a modulation scheme and error correction coding rate (MCS) optimal for the estimated channel state.

A packet error rate will be briefly described below. When, for example, 10 data frames are transmitted and ACKs can be obtained with respect to all the 10 frames, the packet error rate is 0%. If ACKs can be obtained with respect to only six frames out of the 10 frames, the packet error rate is 40%. As described above, a packet error rate can be obtained as the ratio of the number of frames to which ACK could not be obtained to the number of frames transmitted.

Upon receiving a feedback response frame through the antenna unit 201, receiver 202, and MAC protocol processor 204 (step S201), the controller 208 compares the modulation scheme and error correction coding rate notified through the feedback response frame (or the modulation scheme and error correction coding rate selected on the basis of the information notified through the feedback response frame) with the modulation scheme and error correction coding rate selected by the above open-loop link adaptation scheme (step S202). If they coincide with each other, the process advances to step S204. Otherwise, the process advances to step S208.

In step S204, the controller 208 compares the time interval from the transmission of the feedback request frame to the return of the feedback response frame, which is measured by the response time measuring unit 207, i.e., the feedback response time (Tres), with a value (T+T') obtained by adding a predetermined time (T') to the response time threshold (T) determined by the response time threshold determination unit 206. If Tres is smaller than T+T' (step S205), the process advances to step S206 to reflect the feedback response result. If Tres is equal to or more than T+T' (step S205), the process advances to step S207, in which the controller 208 does not reflect the feedback response result.

Assume that the modulation scheme and error correction coding rate notified through a feedback response frame by closed-loop link adaptation control coincide with the modulation scheme and error correction coding rate selected by the above open-loop link adaptation control. In this case, even if the feedback response time exceeds the response time threshold, the controller 208 reflects the feedback result if the response time falls within a given constant time T'.

If the modulation scheme and error correction coding rate notified through a feedback response frame by closed-loop link adaptation control differ from the modulation scheme and error correction coding rate selected by the above open-loop link adaptation control (step S203), the controller 208 compares, in step S208, the feedback response time (Tres) measured by the response time measuring unit 207 with the value (T−T") obtained by subtracting a predetermined time (T") from the response time threshold (T) determined by the response time threshold determination unit 206. If Tres is smaller than T−T" (step S209), the process advances to step S206 to reflect the feedback response result. If Tres is equal to or more than T−T" (step S209), the process advance step S207, in which the controller 208 does not reflect the feedback response result.

Assume that the modulation scheme and error correction coding rate notified through a feedback response frame by closed-loop link adaptation control differ from the modulation scheme and error correction coding rate selected by the above open-loop link adaptation control. In this case, if the feedback response time is shorter than the response time threshold by the time T" or more, the controller 208 reflects the feedback result. In this case, the predetermined times T' and T" may be fixed values or may be set to longer times with an increase in the difference between the modulation scheme and error correction coding rate notified through a feedback response frame by closed-loop link adaptation control and the modulation scheme and error correction coding rate selected by the above open-loop link adaptation control.

Combining with open-loop link adaptation control makes it possible to increase the accuracy of determination of the reliability of a feedback response result.

Second Embodiment

A wireless communication apparatus according to the second embodiment has a function of transmitting an aggregated frame including a plurality of physical frames or MAC frames. A MAC protocol processor 204 has an aggregated frame generating function of generating an aggregated frame including a plurality of frames.

Figure 6:
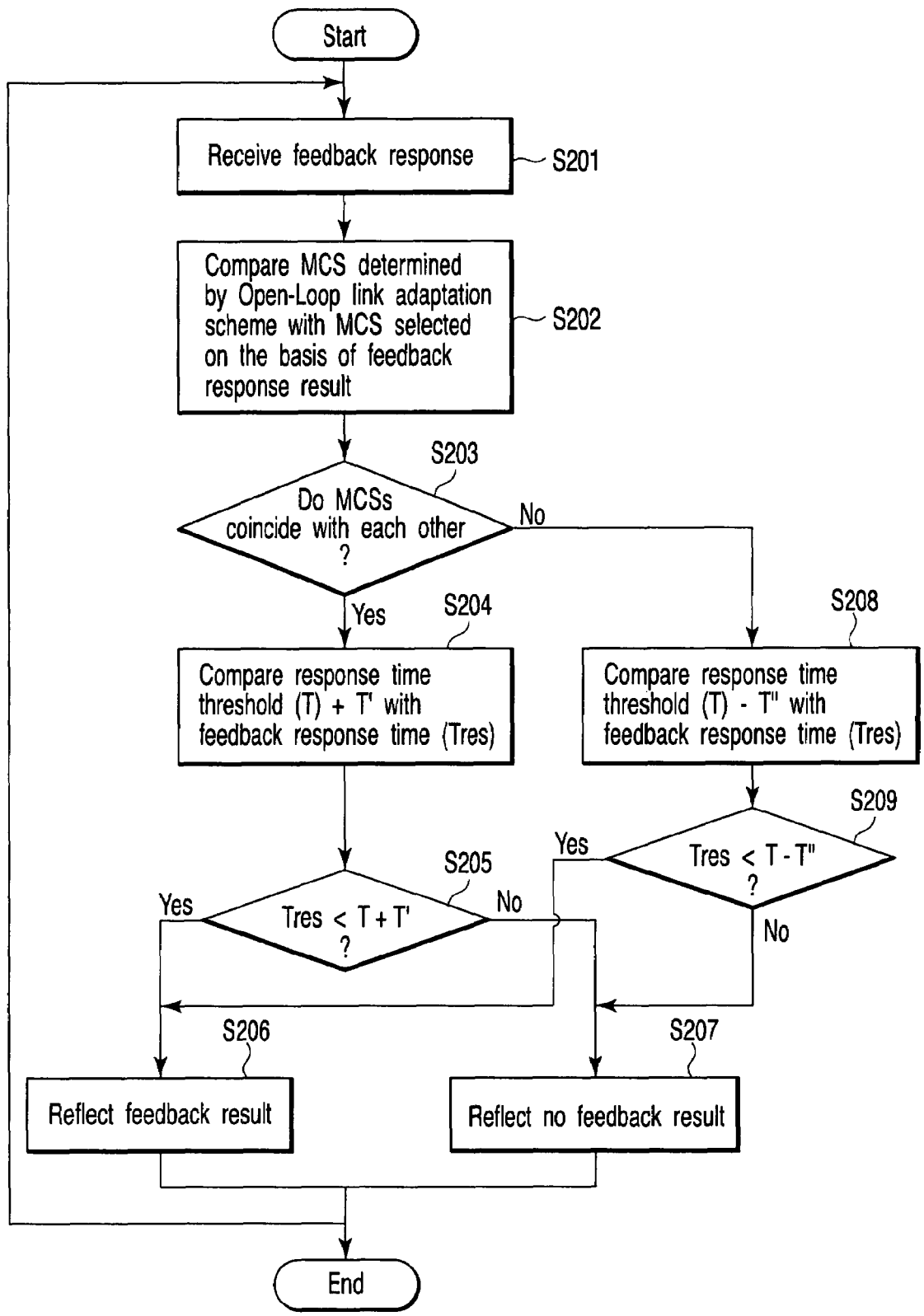
FIG. 6 is a flowchart for explaining the control processing operation of the controller when it comprises an open-loop link adaptation control function as well as a closed-loop link adaptation control function.

A controller 208 of the wireless communication apparatus having such functions performs control on the number of frames in an aggregated frame by using a feedback response time (Tres) and a response time threshold (T) in addition to or in place of the control shown in FIGS. 5 and 6.

Control processing for the number of frames in an aggregated frame in the controller 208 will be described with reference to the flowchart shown in FIG. 7. Note that the same reference numerals as in FIG. 5 denote the same parts in FIG. 7.

Upon receiving a feedback response frame (step S101), the controller 208 compares the response time threshold (T) determined by a response time threshold determination unit 206 with the feedback response time (Tres) measured by a response time measuring unit 207 (step S102).

If the feedback response time (Tres) is shorter than the response time threshold (T) (step S103), the process advances to step S111. In step S111, the controller 208 maintains the current number of frames in the aggregated frame. The process then returns to step S101.

If the feedback response time (Tres) is equal to or more than the response time threshold (T) (step S103), the process advances to step S112. In step S112, the controller 208 temporarily decreases the current number of frames in the aggregated frame.

In this case, the following methods are available as methods of decreasing the number of frames in an aggregated frame:

method A1) determining a new number of frames by subtracting a predetermined number of frames (e.g., one) from the current number of frames in the aggregated frame;

method A2) determining a new number of frames by subtracting the number of frames corresponding to a predetermined ratio (e.g., 40%) to the current number of frames in the aggregated frame from the current number of frames, for example, determining, as a new number of frames, the number of frames corresponding to 60% of the current number of frames; and method A3) determining the number of frames to be subtracted from the current number of frames or a ratio corresponding to the number of frames to be subtracted from the current number of frames in accordance with a time amount (e.g., several ms) corresponding to the difference between a feedback response time and a response time threshold or the ratio (e.g., several %) of the difference to the response time threshold. In this case, as the exceeding width (difference or ratio) of a feedback response time with respect to a response time threshold increases, the number of frames to be subtracted or the ratio is increased. As the exceeding width of a feedback response time with respect to the response time threshold increases, the reliability of a feedback response result deteriorates. In such a case, in particular, the amount to be subtracted is increased.

The controller 208 notifies a MAC protocol processor 204 of the new number of frames determined by one of the methods A1 to A3 described above. As a result, the MAC protocol processor 204 generates an aggregated frame including the notified new number of frames, and transmits the aggregated frame through a transmitter 203 and an antenna 201.

Note that after the controller 208 temporarily decreases the number of frames in an aggregated frame in step S112, the process returns to step S101.

Note that if the controller 208 temporarily decreases the number of frames in the aggregated frame in step S112, and the feedback response time at the time of the reception of a feedback response frame (step S101) is shorter than the response time threshold (steps S102 and S103), the controller 208 increases the number of frames in the aggregated frame to the original number of frames in step S111.

The following methods are available as methods of increasing the number of frames in an aggregated frame:

method B1) determining the original number of frames before subtraction as a new number of frames;

method B2) determining a new number of frames by adding a predetermined number of frames (e.g., one) to or the number of frames corresponding to a predetermined ratio (e.g., 40%) to the current number of frames; and method B3) determining the number of frames to be added to the current number of frames or a ratio corresponding to the number of frames to be added to the current number of frames in accordance with a time amount corresponding to the difference between a response time threshold and a feedback response time or the ratio of the difference with respect to the response time threshold. In this case, as the difference or ratio increases, the number of frames to be added or the ratio is increased.

As described above, if a feedback response time is longer than a response time threshold, the controller 208 performs control to temporarily decrease the number of frames in an aggregated frame. If a feedback response time is shorter than a response time threshold, the controller 208 performs control to increase the number of frames in an aggregated frame to the original number of frames. The response time threshold used for control to decrease the number of frames may be equal to that used for control to increase the number of frames. In some case, the response time threshold determination unit 206 may determine different response time thresholds for the respective control operations.

In addition, the number of frames to be added at a time when the number of frames in an aggregated frame is to be increased is preferably smaller than the number of frames to be decreased at a time when the number of frames in an aggregated frame is to be decreased. That is, with a decrease in reliability, the number of frames to be subtracted at a time is increased. In contrast, when the number of frames is to be increased to the original number of frames, the number of frames to be increased at a time is careful to be decreased. This improves the effect of preventing a deterioration in communication quality or throughput.

According to the above description, the controller 208 performs control to increase the number of frames in an aggregated frame by being triggered when the feedback response time at the time of the reception of a feedback response frame is shorter than a response time threshold. In addition to this case, the controller 208 may perform control to increase the number of frames in an aggregated frame by being triggered when it is confirmed that the packet error rate in transmission with given MCS is equal to or less than a predetermined threshold.

It suffices to use one of the above methods B1 to B3 as a method of increasing the number of frames in an aggregated frame in this case.

In addition, if no feedback request or response frame is exchanged or it takes much time to receive a feedback response even though a feedback request and a response frame are exchanged, it is possible to return the number of frames in the aggregated frame to the original number of frames upon determining reliability depending on whether the error rate is lower than a predetermined threshold.

As described above, the second embodiment determines the reliability of a feedback response result by using the feedback response time required to receive a feedback response frame after the transmission of a feedback request frame and the response time threshold obtained from the degree of fading variation. Upon determining that the reliability is low, the embodiment temporarily decreases the number of frames in the aggregated frame to reflect the feedback response result. This makes it possible to prevent an increase in packet error rate which can occur when the transmission rate becomes high as compared with optimal MCS (modulation scheme and error correction coding rate) or prevent a deterioration in throughput which can occur when the transmission rate becomes low as compared with optimal MCS. That is, temporarily decreasing the number of frames in an aggregated frame when the reliability is low makes it possible to suppress the above problem to a necessary minimum level as compared with the case wherein the number of frames is kept large.

In addition, decreasing the number of frames in an aggregated frame can shorten the time occupied by frame transmission. This makes it possible for the overall system to shorten the response time until the return of a feedback response and hence to improve the reliability of information to be notified through a feedback response.

Figure 7:
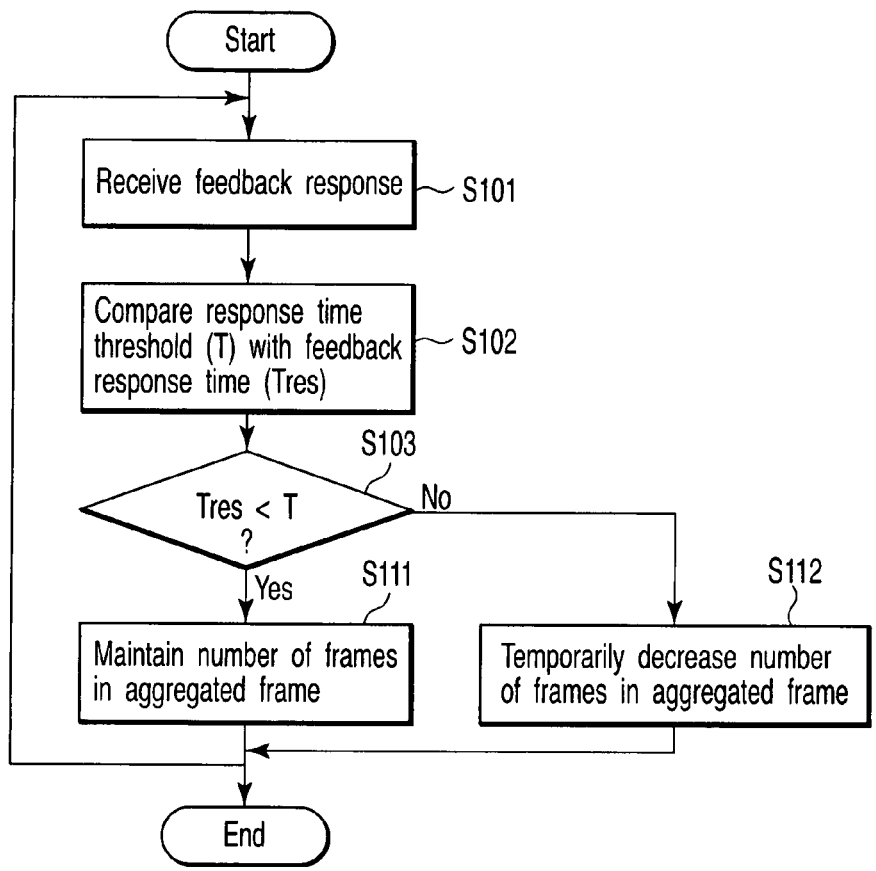
FIG. 7 is a flowchart for explaining the control processing operation of a controller according to the second embodiment.

Note that it is possible to combine the control on the number of frames in an aggregation frame shown in FIG. 7 with the control shown in FIGS. 5 and 6 or open-loop link adaptation control.

In this case, a response time threshold used for the control in FIG. 7 may be equal to that used in FIGS. 5 and 6, or the response time threshold determination unit 206 may determine different response time thresholds for the respective control operations.

Third Embodiment

The first embodiment determines a response time threshold on the basis of the degree of fading variation, and compares an actually measured feedback response time with the response time threshold to determine the reliability of the feedback response.

The third embodiment calculates, on the basis of an actually measured feedback response time, a time correlation coefficient value in the feedback response time. Determining the reliability of a feedback response by using this time correlation coefficient value reduces the processing amount as compared with the technique described in the first embodiment.

Figure 8:
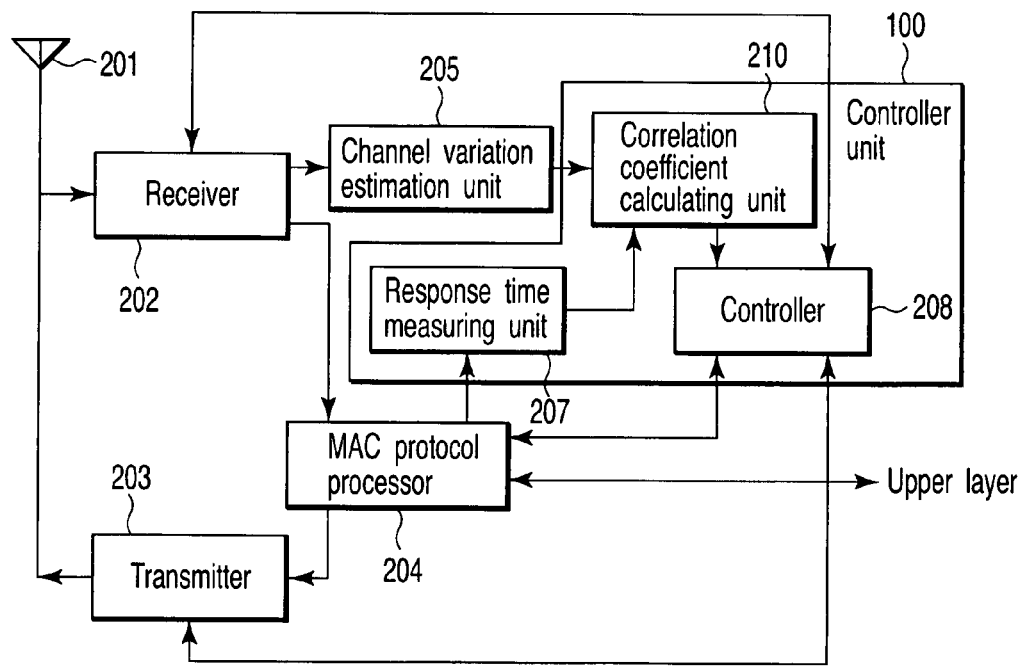
FIG. 8 is a block diagram showing an example of the arrangement of a wireless communication apparatus according to the third embodiment.

FIG. 8 shows an example of the arrangement of a wireless communication apparatus according to the third embodiment. Note that the same reference numerals as in FIG. 2 denote the same parts in FIG. 8, and only different portions will be described below. The arrangement in FIG. 8 includes a correlation coefficient calculating unit 210 in place of the response time threshold determination unit 206 in FIG. 2.

The wireless communication apparatus in FIG. 8 has a function of transmitting an aggregated frame including a plurality of physical frames or MAC frames. A MAC protocol processor 204 has an aggregated frame generating function of generating an aggregated frame including a plurality of frames.

If it is possible to calculate or estimate a maximum Doppler frequency $f_d$, the correlation coefficient calculating unit 210 calculates a time correlation coefficient value in an actually measured feedback response time by substituting the obtained Doppler frequency $f_d$ and the actually measured feedback response time into equations (1) and (2).

If it is impossible to calculate or estimate the maximum Doppler frequency $f_d$, the correlation coefficient calculating unit 210 obtains the time correlation value between the reception power or envelope measured at a given time point and the reception power or envelope at a time point separated by the actually measured feedback response time. If, for example, the measured feedback response time is 1.5 ms, the correlation coefficient calculating unit 210 obtains the time correlation value between the reception powers or envelopes at the two different time points separated from each other by 1.5 ms. Note that a correlation value closer to "1" indicates that the correlation between the two values is higher and hence the variation degree is lower.

As described in the first embodiment, this is equivalent to the time correlation coefficient values obtained by substituting 1.5 ms in place of $\tau$ of equations (1) and (2). That is, this is equivalent to calculating, from equations (1) and (2), respectively:

$$\rho_I(1.5\ ms) = J_0(2\pi f_d * 1.5\ ms)$$

$$\rho_r(1.5\ ms) = J_0^2(2\pi f_d * 1.5\ ms)$$

As described above, a larger value of $\rho_I$ or $\rho_r$, i.e., a larger time correction, indicates smaller propagation path state variation, and vice versa.

When receiving a feedback response frame, a controller 208 compares $\rho_I$ or $\rho_r$ calculated by the correlation coefficient calculating unit 210 with a predetermined correlation coefficient threshold $\alpha$ (e.g., 0.5) to determine the reliability of the feedback response. By using this determination result, the controller 208 determines whether to use the modulation scheme and error correction coding rate notified through the feedback response frame by closed-loop link adaptation control, and/or controls the number of frames in the aggregated frame generated by the MAC protocol processor 204.

If a time correlation coefficient value $\rho$ ($\rho_I$ or $\rho_r$ in this case) calculated by the correlation coefficient calculating unit 210 is larger than the correlation coefficient threshold $\alpha$, the controller 208 determines that the feedback response frame is reliable. If the time correlation coefficient value $\rho$ is equal to or less than the correlation coefficient threshold $\alpha$, the controller 208 determines that the feedback response frame is not reliable.

Note that the correlation coefficient threshold $\alpha$ need not be a fixed value, but may be variable in accordance with the application to be used or the use environment. Alternatively, this value may be variable in accordance with information at the MAC layer, e.g., the type of access control, the type of retransmission method, the number of terminals belonging to the same system, or an error rate.

Figure 9:
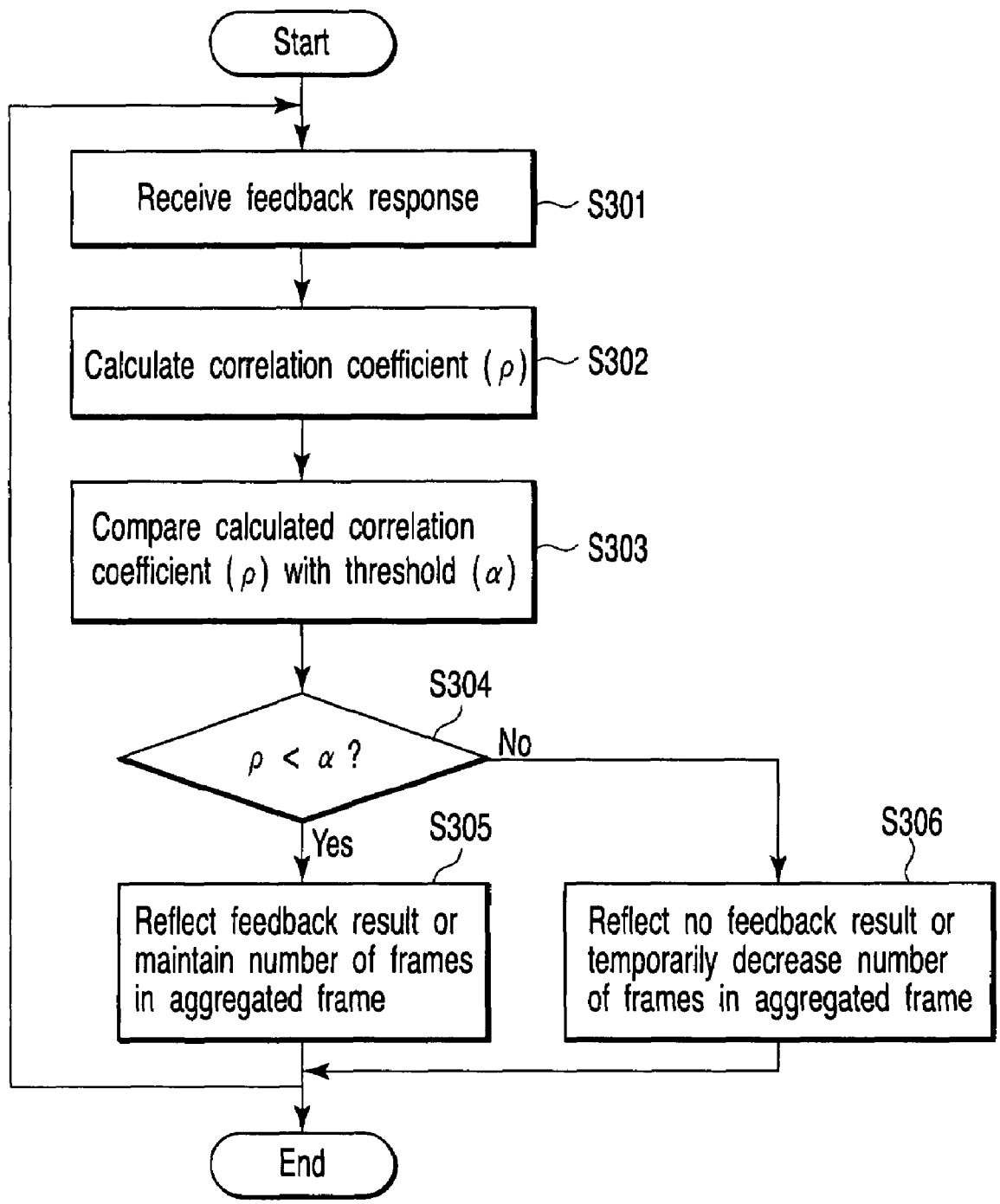
FIG. 9 is a flowchart for explaining the control processing operation of the controller.

Control processing by the controller 208 according to the third embodiment will be described with reference to the flowchart shown in FIG. 9.

When a feedback response frame is received through an antenna 201, a receiver 202, and the MAC protocol processor 204 (step S301), a channel variation estimation unit 205 calculates a time correlation value ρ ($ρ_I$ or $ρ_r$) between two different time points separated by the feedback response time measured by a response time measuring unit 207 at the time of the reception of the feedback response frame by using the feedback response time (step S302). The process then advances to step S303.

In step S303, the controller 208 compares the time correlation coefficient value ρ with a correlation coefficient threshold α set and stored in the controller 208. If the correlation coefficient value p is larger than the correlation coefficient threshold α (step S304), that is, the channel state variation is small, the process advances to step S305. If the correlation coefficient value p is equal to or less than the correlation coefficient threshold α (step S304), that is, the channel state variation is large, the process advances to step S306.

In step S305, the controller 208 notifies a transmitter 203 of the modulation scheme and error correction coding rate notified through the feedback response frame as in step S104 in FIG. 5, and maintains the current number of frames in the aggregated frame as in step S111 in FIG. 7. Thereafter, the transmitter 203 performs modulation processing and error correction coding processing in accordance with the notified modulation scheme and error correction coding rate.

In step S306, since the information notified through the feedback response frame is low in reliability, the controller 208 does not reflect the feedback response result as in step S105 in FIG. 5. In addition, as in step S112 in FIG. 7, the controller 208 temporarily decreases the current number of frames in the aggregated frame by using one of the methods A1 to A3.

After the processing in step S305 or S306, the process returns to step S301.

As described in the second embodiment, if the number of frames in the aggregated frame is temporarily decreased in step S306 and the correlation coefficient value p at the time of the reception of the feedback response frame is larger than the correlation coefficient threshold α (steps S303 and S304), the controller 208 increases the number of frames in the aggregated frame to the original number of frames by using one of the methods B1 to B3 in step S305.

Fourth Embodiment

The following description concerns a case wherein the controller 208 in FIG. 2 performs control to determine the transmission frequency or transmission period of a feedback request frame on the basis of the degree of fading variation described in the first embodiment.

A controller 208 complies with the following policy when performing such control.

As the degree of channel fading variation estimated by a channel variation estimation unit 205 indicates longer period variation and the channel variation is slower (i.e., a fading variation period τ is larger than a predetermined threshold β and the variation degree is smaller), the controller 208 decreases the transmission frequency of a feedback request frame or increases the transmission period of a feedback request frame. As the degree of channel fading variation estimated by the channel variation estimation unit 205 indicates shorter period variation and the channel variation is faster (i.e., the fading variation period τ is equal to or less than the threshold β and the variation degree is larger), the controller 208 increases the transmission frequency of a feedback request frame or shortens the transmission period of a feedback request frame.

The transmission frequency or transmission period of a feedback request frame determined by the controller 208 is notified to a MAC protocol processor 204. The MAC protocol processor 204 transmits a feedback request frame from an antenna unit 201 through a transmitter 203 in accordance with the notified transmission frequency or transmission period after a series of access control operations.

Changing the transmission frequency or period of a feedback request in accordance with the degree of channel variation makes it possible to issue a feedback request in accordance with a channel variation state and to perform closed-loop link adaptation control following up a wireless propagation state which varies without unnecessarily transmitting feedback requests or creating an unnecessary traffic.

Increasing the number of times of transmission with an increase in the speed of channel variation can perform link adaptation control with high accuracy. If the channel variation is slow, it is not always necessary to perform link adaptation control with high accuracy. Therefore, decreasing the number of times of transmission of a feedback request makes it possible to prevent the occurrence of an unnecessary traffic due to feedback transmission/reception.

If the controller 208 has the open-loop link adaptation control function as well as the above closed-loop link adaptation control function, the controller 208 may determine the transmission frequency or transmission period of a feedback request frame on the basis of the degree of fading variation, and transmit a feedback request frame in the following case.

That is, upon determining to change the modulation scheme and error correction coding rate (i.e., selecting a new modulation scheme and error correction coding error different from the current modulation scheme and error correction coding rate) by open-loop link adaptation control (for example, estimating a wireless channel state by using the error rate based on whether a confirmation response (ACK) to a transmitted data frame is obtained, and selecting a modulation scheme and error correction coding rate (MCS) on the basis of the estimated channel state), the controller 208 issues a request to transmit a feedback request frame to the MAC protocol processor 204.

In open-loop link adaptation control, since there is no clear information for determining whether to increase the transmission rate, in particular, the controller 208 transmits a closed-loop feedback request frame by being triggered when determining to change the MCS by open-loop control. This allows the use of a feedback result in closed-loop control and hence makes it possible to improve the reliability of determination whether to change the MCS without transmitting any unnecessary feedback request frame.

The wireless communication apparatus described above can prevent a deterioration in communication quality or throughput.

What is claimed is:

1. A wireless communication apparatus comprising:
   a transmitter;
   a receiver;
   an estimation unit configured to estimate a degree of channel variation; and
   a control unit configured to determine a modulation scheme and an error correction coding scheme used by the transmitter;
   wherein the control unit includes a transmission control unit configured to control the transmitter so as to transmit a first frame for requesting response information necessary to select the modulation scheme and the error correction coding scheme;

a measurement unit configured to measure a response time between an instant when the transmitter transmits the first frame and an instant when the receiver receives a second frame including the response information;

a threshold determination unit configured to determine a threshold value of the response time for determining reliability of the response information, based on the degree of channel variation; and a determination unit configured to determine a first set of the modulation scheme and the error correction coding scheme selected based on the response information included in the second frame received by the receiver in the response time shorter than the threshold value.

2. The apparatus according to claim 1, wherein the threshold value determined by the threshold determination unit is smaller as the degree of channel variation is faster.

3. The apparatus according to claim 1, wherein the estimation unit estimates the degree of channel variation based on a fading variation period of signals received by the receiver, and the degree of channel variation is faster as the fading variation period is shorter.

4. The apparatus according to claim 1, wherein the control unit further includes a selection unit configured to select a second set of the modulation scheme and the error correction coding scheme, based on a packet error rate with respect to frames transmitted by the transmitter, and wherein
the determination unit determines the first set,
(a) if the first set is the same as the second set and the response time is shorter than a first threshold value obtained by adding a given value to the threshold value, or
(b) if the first set is different from the second set and the response time is shorter than a second threshold value obtained by subtracting a given value from the threshold value.

5. The apparatus according to claim 1, wherein
the estimation unit estimates the degree of channel variation periodically or every time the receiver receives a signal, and
the threshold determination unit determines the threshold value periodically or every time the receiver receives the signal based on the degree of channel variation.

6. The apparatus according to claim 1, wherein the transmission control unit controls the transmitter so as to transmit the first frame with transmission frequency or transmission period determined based on the degree of state variation.

7. The apparatus according to claim 6, wherein the transmission frequency increase as the degree of state variation increases.

8. The apparatus according to claim 6, wherein the transmission period shortens as the degree of state variation increases.

9. The apparatus according to claim 1, wherein the control unit further includes
a selection unit configured to select a second set of the modulation scheme and the error correction coding scheme, based on a packet error rate with respect to frames transmitted by the transmitter, and wherein
the transmission control unit controls the transmitter so as to transmit the first frame when the selection unit selects the second set.

10. A wireless communication apparatus comprising:
a transmitter;
a receiver;
a generation unit configured to generate an aggregated frame including a plurality of frames and being transmitted by the transmitter;
an estimation unit configured to estimate a degree of channel variation;
a transmission control unit configured to control the transmitter so as to transmit a first frame for requesting response information necessary to select a modulation scheme and an error correction coding scheme used by the transmitter;
a measurement unit configured to measure a response time between an instant when the transmitter transmits the first frame and an instant when the receiver receives a second frame including the response information;
a threshold determination unit configured to determine a threshold value of the response time for determining reliability of the response information, based on the degree of channel variation; and
a control unit configured to control the generation unit so as
  (a) to maintain a current number of frames in the aggregated frame if the response time measured by the measuring unit is shorter than the threshold value, and so as
  (b) to decrease the current number of frames in the aggregated frame if the response time is longer than or equal to the threshold value.

11. The apparatus according to claim 10, wherein the control unit controls the generation unit so as to decrease the current number of frames in the aggregated frame by a predetermined number of frames or a number of frames corresponding to a predetermined ratio.

12. The apparatus according to claim 10, wherein the control unit determines a number of frames to be subtracted from the current number of frames in the aggregated frame in accordance with (a) a difference between the response time measured by the measurement unit and the threshold value or (b) a ratio of the difference to the threshold value.

13. The apparatus according to claim 10, wherein the control unit controls the generation unit so as to increases the current number of frames in the aggregated frame if the response time of the second frame is shorter than the threshold value, after the control unit controls the generation unit so as to decrease a number of frames in the aggregated frame.

14. The apparatus according to claim 10, wherein the control unit controls the generation unit so as to increases the current number of frames in the aggregated frame if a packet error rate with respect to the aggregated frame transmitted by the transmitter is not more than a predetermined threshold, after the control unit controls the generation unit so as to decrease a number of frames in the aggregated frame.

15. A wireless communication apparatus comprising:
a transmitter;
a receiver; and
a first control unit configured to determine a modulation scheme and an error correction coding scheme used by the transmitter;
wherein the first control unit includes
a transmission control unit configured to control the transmitter so as to transmit a first frame for requesting response information necessary to select the modulation scheme and the error correction coding scheme;
a measurement unit configured to measure a response time between an instant when the transmitter transmits the first frame and an instant when the receiver receives a second frame including the response information;

a calculation unit configured to calculate a correlation value between reception powers or reception envelopes at two time points separated from each other by the response time; and a determination unit configured to determine the modulation scheme and the error correction coding scheme selected based on the response information included in the second frame received by the receiver, if the correlation value is larger than a predetermined threshold value for determining reliability of the response information in the second frame.

16. The apparatus according to claim 15, further comprises a generation unit configured to generate an aggregated frame including a plurality of frames and being transmitted by the transmitter; and a second control unit configured to control the generation unit so as (a) to maintain a current number of frames in the aggregated frame if the correlation value is larger than the threshold value, and so as (b) to decrease the current number of frames in the aggregated frame if the correlation value is less than or equal to the threshold value.

17. A transmission control method for a wireless communication apparatus including a transmitter and a receiver, and determining a modulation scheme and an error correction coding scheme used by the transmitter, the method comprising:

estimating a degree of channel variation;

transmitting, by the transmitter, a first frame for requesting response information necessary to select the modulation scheme and the error correction coding scheme;

measuring a response time between an instant when the transmitter transmits the first frame and an instant when the receiver receives a second frame including the response information;

determining a threshold value of the response time for determining reliability of the information, based on the degree of channel variation; and determining a first set of the modulation scheme and the error correction coding scheme selected based on the response information included in the second frame received by the receiver in the response time shorter than the threshold value.

18. The method according to claim 17, wherein the estimating estimates the degree of channel variation based on a fading variation period, and the degree of channel variation increases as the fading variation period shortens.

19. The method according to claim 17, further includes selecting a second set of the modulation scheme and the error correction coding scheme, based on an error rate with respect to frames transmitted by the transmitter, and wherein the determining determines the first set,
(a) if the first set is the same as the second set and the response time is shorter than a first threshold value obtained by adding a given value to the threshold value, or
(b) if the first set is different from the second set and the response time is shorter than a second threshold value obtained by subtracting a given value from the threshold value.

20. A transmission control method for a wireless communication apparatus including a transmitter and a receiver, the method comprising:

generating an aggregated frame including a plurality of frames and being transmitted by the transmitter;

estimating a degree of channel variation;

transmitting, by the transmitter, a first frame for requesting response information necessary to select a modulation scheme and an error correction coding scheme used by the transmitter;

measuring a response time between an instant when the transmitter transmits the first frame and an instant when the receiver receives a second frame including the response information;

determining a threshold value of the response time for determining reliability of the information, based on the degree of channel variation;

maintaining a current number of frames in the aggregated frame if the response time measured by the measuring unit is shorter than the threshold value; and decreasing the current number of frames in the aggregated frame if the response time is longer than or equal to the threshold value.

* * * * *